United States Patent
Burke et al.

(10) Patent No.: US 10,254,570 B2
(45) Date of Patent: Apr. 9, 2019

(54) CLOSED LOOP QUADRATURE BIAS CONTROL FOR AN IQ PHASE MODULATOR

(71) Applicant: Lumentum Operations LLC, Milpitas, CA (US)

(72) Inventors: Dan Burke, Ottawa (CA); Fredrik Sy, Ottawa (CA)

(73) Assignee: Lumentum Operations LLC, Milpitas, CA (US)

( * ) Notice: Subject to any disclaimer, the term of this patent is extended or adjusted under 35 U.S.C. 154(b) by 0 days.

(21) Appl. No.: 15/685,584

(22) Filed: Aug. 24, 2017

(65) Prior Publication Data
US 2019/0064556 A1    Feb. 28, 2019

(51) Int. Cl.
*H04B 10/00* (2013.01)
*G02F 1/025* (2006.01)
*G02F 1/01* (2006.01)
*G02F 1/377* (2006.01)

(52) U.S. Cl.
CPC ............ *G02F 1/025* (2013.01); *G02F 1/0123* (2013.01); *G02F 1/3775* (2013.01)

(58) Field of Classification Search
CPC .. G02F 1/0123; G02F 1/225; G02F 2001/212; G02F 2203/21; H04B 10/50575; H04B 10/50595
USPC .......................................................... 398/183
See application file for complete search history.

(56) References Cited

U.S. PATENT DOCUMENTS

| 7,266,306 B1 * | 9/2007 | Harley ................. H04B 10/505 398/182 |
| 2009/0086303 A1 * | 4/2009 | Ide ..................... H04B 10/5053 359/279 |
| 2010/0245968 A1 * | 9/2010 | Smith ................... G02F 1/0123 359/239 |

(Continued)

FOREIGN PATENT DOCUMENTS

| CN | 106549714 | 3/2017 |
| JP | 2011075913 | 4/2011 |

OTHER PUBLICATIONS

Kawakami et al., "Auto Bias Control Technique Based on Asymmetric Bias Dithering for Optical QPSK Modulation," Journal of Lightwave Technology, vol. 30, No. 7, Apr. 1, 2012, 7 pages.

(Continued)

*Primary Examiner* — Don N Vo
(74) *Attorney, Agent, or Firm* — Harrity & Harrity, LLP

(57) ABSTRACT

An electro-optic device may comprise a Mach-Zehnder modulator (MZM) and one or more components. The one or more components may apply a child DC bias with dither to arms of a first branch of the MZM and to arms of a second branch of the MZM, and determine a second harmonic of a first return signal. The one or more components may apply a child DC bias with phase-shifted dither to the arms of the first branch or to the arms of the second branch, and determine a second harmonic of a second return signal. The one or more components may determine, based on the second harmonics, whether the first branch and the second branch are operating at quadrature, and may selectively adjust parent DC biases, applied to the first branch and the second branch, based on whether the first branch and the second branch are operating at quadrature.

20 Claims, 7 Drawing Sheets

(56) References Cited

U.S. PATENT DOCUMENTS

| | | | |
|---|---|---|---|
| 2012/0008963 A1* | 1/2012 | Aruga | H04B 10/5053 398/183 |
| 2014/0168741 A1 | 6/2014 | Li et al. | |
| 2014/0233963 A1* | 8/2014 | Le Taillandier De Gabory | H04B 10/541 398/183 |
| 2014/0308047 A1 | 10/2014 | Mak et al. | |
| 2015/0050030 A1 | 2/2015 | Le Taillandier De Gabory | |
| 2015/0236790 A1* | 8/2015 | Guo | H04B 10/5053 398/25 |
| 2018/0074348 A1* | 3/2018 | Fujita | G02F 1/0123 |

OTHER PUBLICATIONS

European Search Report corresponding to EP 18188975.9 dated Jan. 15, 2019, 8 pages.

* cited by examiner

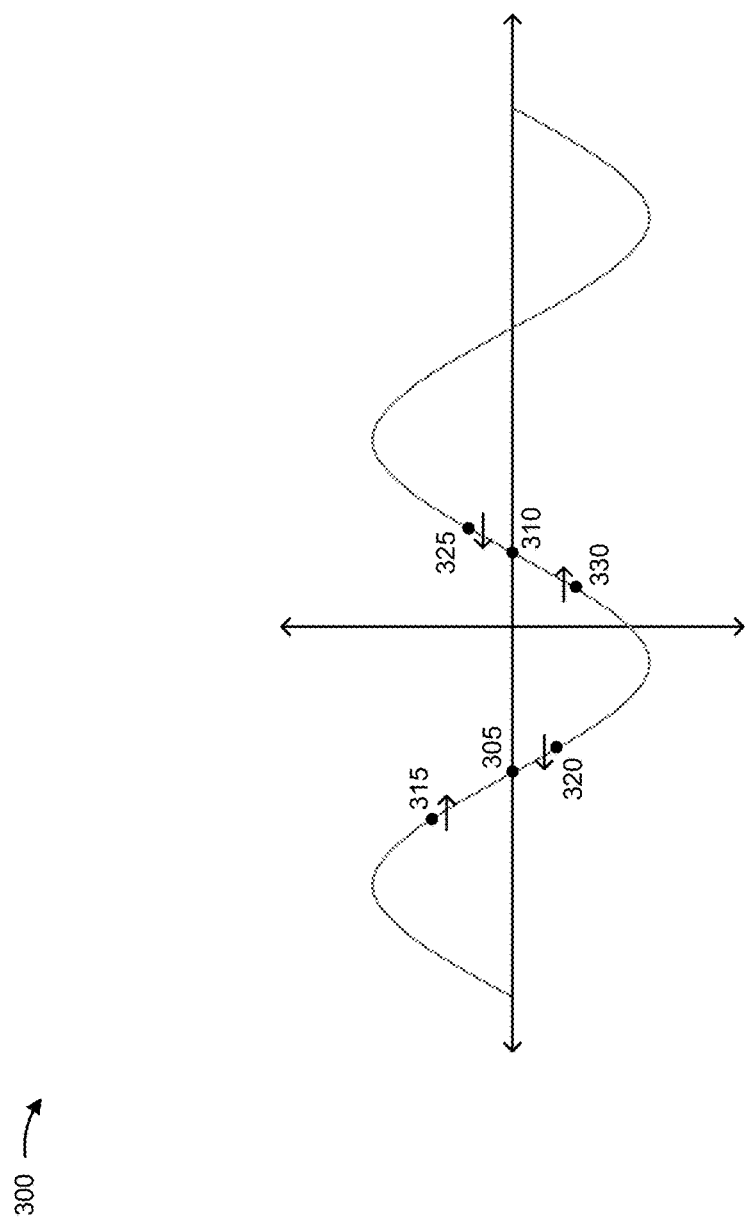

US 10,254,570 B2

CLOSED LOOP QUADRATURE BIAS CONTROL FOR AN IQ PHASE MODULATOR

TECHNICAL FIELD

The present disclosure relates generally to an in-phase (I) and quadrature (Q) phase modulator (herein referred to as an IQ phase modulator) and, more particularly, to a closed loop quadrature bias control technique for setting a phase difference between branches of an IQ phase modulator such that the IQ phase modulator operates in quadrature.

BACKGROUND

An electro-optic device, such as an electro-optic IQ phase modulator, may be used to encode data, represented by a set of electrical signals, into the phase and/or amplitude of light as the light passes through the IQ phase modulator. In a typical IQ phase modulator (e.g., a Mach-Zehnder (MZ) modulator), light (e.g., generated by a light source, such as a laser) is split between an I branch and a Q branch of the modulator, where each branch comprises a series of optical waveguides with a set of electrodes placed along (e.g., on, over, adjacent to, and/or the like) the series of waveguides. In order to enable IQ modulation, the portion of the light in the Q branch is put at 90 degrees (°) out of phase (i.e., at quadrature) from the portion of the light passing through the I branch. For example, respective parent DC biases may be applied to electrodes arranged on the I branch and/or the Q branch in order to introduce phase shifts that put the portion of the light in the Q branch at quadrature with the portion of the light in the I branch.

In the IQ modulator, the portions of the light are further split between arms of each branch (e.g., left and right arms of the I branch, and left and right arms of the Q branch). In order to encode data in each portion of the light while passing through the IQ phase modulator, a first electrical signal (e.g., a radio frequency (RF) signal) is differentially applied to electrodes on the left and right I arms (herein referred to as an I signal), while a second electrical signal is differentially applied to electrodes on the left and right Q arms (herein referred to as a Q signal). The I signal and the Q signal represent the data to be encoded in the phase and/or the amplitude of the light. Applying the I signal and the Q signal to the respective arms provides amplitude modulation of the light passing through the I and Q branches, respectively. The modulated portions of the light are then recombined in the modulator to form modulated output light. Here, the amplitude and/or the phase of modulated output light are a result of the application of the I signal and the Q signal and, thus, the modulated output light carries the data.

SUMMARY

According to some possible implementations, an electro-optic device may comprise a Mach-Zehnder modulator (MZM); and one or more components to: apply a child DC bias with dither to arms of a first branch of the MZM and to arms of a second branch of the MZM; determine a second harmonic of a first return signal associated with applying the child DC bias with dither to the arms of the first branch and to the arms of the second branch; apply a child DC bias with phase-shifted dither to the arms of the first branch or to the arms of the second branch, where the phase-shifted dither may be out of phase from the dither; determine a second harmonic of a second return signal associated with applying the child DC bias with phase-shifted dither to the arms of the first branch or to the arms of the second branch; determine, based on the second harmonic of the first return signal and the second harmonic of the second return signal, whether the first branch and the second branch are operating at quadrature; and selectively adjust parent DC biases, applied to the first branch and the second branch, based on whether the first branch and the second branch are operating at quadrature.

According to some possible implementations, an electro-optic IQ phase modulator may comprise a Mach-Zehnder modulator (MZM); and a controller to: determine a second harmonic of a first return signal resulting from application of a child DC bias with dither to arms of a first branch of the MZM and to arms of a second branch of the MZM; determine a second harmonic of a second return signal resulting from application of a child DC bias with phase-shifted dither to the arms of the first branch or to the arms of the second branch, where the phase-shifted dither may be out of phase from the dither; determine, based on the second harmonic of the first return signal and the second harmonic of the second return signal, whether the first branch and the second branch are operating at quadrature; and selectively adjust parent DC biases, applied to the first branch and the second branch, based on whether the first branch and the second branch are operating at quadrature.

According to some possible implementations, a method may include applying, by a controller, a child DC bias with dither to arms of a first branch of a Mach-Zehnder modulator (MZM) and to arms of a second branch of the MZM; determining, by the controller, a second harmonic of a first return signal associated with applying the child DC bias with dither to the arms of the first branch and to the arms of the second branch; applying, by the controller, a child DC bias with phase-shifted dither to the arms of the first branch or to the arms of the second branch, where the phase-shifted dither may be out of phase from the dither; determining, by the controller, a second harmonic of a second return signal associated with applying the child DC bias with phase-shifted dither to the arms of the first branch or to the arms of the second branch; determining, by the controller, whether the first branch and the second branch are operating at quadrature based on the second harmonic of the first return signal and the second harmonic of the second return signal; and selectively adjusting, by the controller, parent DC biases, applied to the first branch and the second branch, based on whether the first branch and the second branch are operating at quadrature.

BRIEF DESCRIPTION OF THE DRAWINGS

FIG. 3 is a diagram of an example plot associated with adjusting parent DC biases in order to ensure operation of an IQ phase modulator at quadrature.

DETAILED DESCRIPTION

The following detailed description of example implementations refers to the accompanying drawings. The same reference numbers in different drawings may identify the same or similar elements. The implementations described below are merely examples and are not intended to limit the implementations to the precise forms disclosed. Instead, the implementations were selected for description to enable one of ordinary skill in the art to practice the implementations.

As described above, an electro-optic IQ phase modulator may be used to encode data into a phase and/or an amplitude of light that passes through the IQ phase modulator. In order to maintain integrity of and/or reduce errors associated with the data being modulated for a given encoding scheme (e.g., quadrature phase shift keying (QPSK), quadrature amplitude modulation (QAM), 16QAM, 64QAM, and/or the like) the phase difference of a portion of the light passing through the I branch and a portion of the light passing through the Q branch should be held as close as possible to 90° (e.g., since larger or smaller phase differences may cause data encoding/decoding errors). This 90° phase difference is referred to as the quadrature operating point, or the "quad point."

However, over lifetime operation of the IQ phase modulator, behavior of the IQ phase modulator may change due to, for example, aging of components of the IQ phase modulator, changing thermal conditions around the IQ phase modulator, and/or the like. Such changing behavior may cause the phase difference between the I and Q branches to deviate from the quad point, which may, for example, result in data encoding/decoding errors.

Some implementations described herein provide a closed loop quadrature bias control technique for monitoring and/or controlling operation of an IQ phase modulator in order to cause the IQ phase modulator to operate at the quad point, despite behavioral changes and/or fabrication tolerances associated with the IQ phase modulator. As described in further detail below, the closed loop quadrature bias control technique monitors and/or controls the operation of the IQ phase modulator based on applying child DC biases with dither to arms of I and Q branches of the IQ phase modulator. As described below, using the closed loop quadrature bias control technique, operation of the IQ phase modulator at quadrature can be ensured without affecting or delaying data encoded by the IQ phase modulator.

Figure 1A:
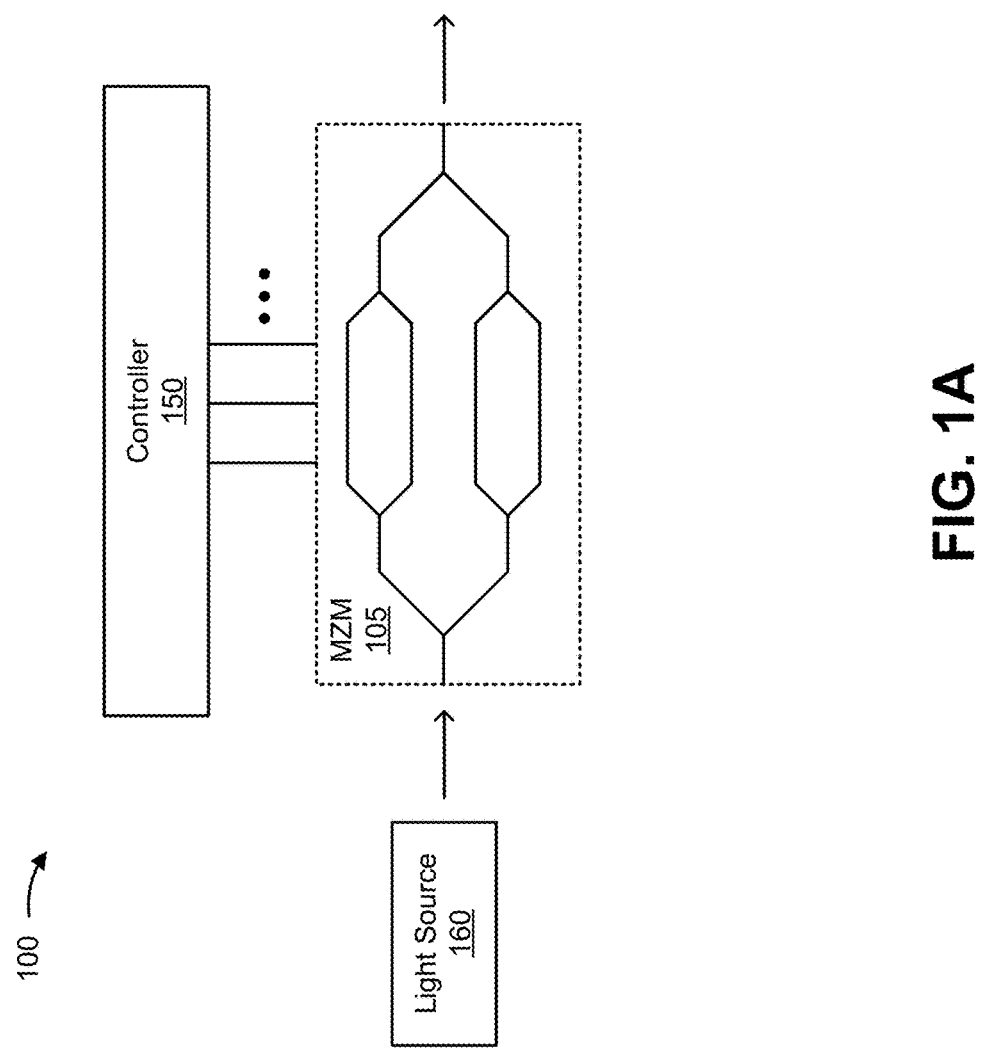
FIGS. 1A and 1B are diagrams of an example environment in which the closed loop quadrature bias control technique, described herein, may be implemented.
Figure 1B:
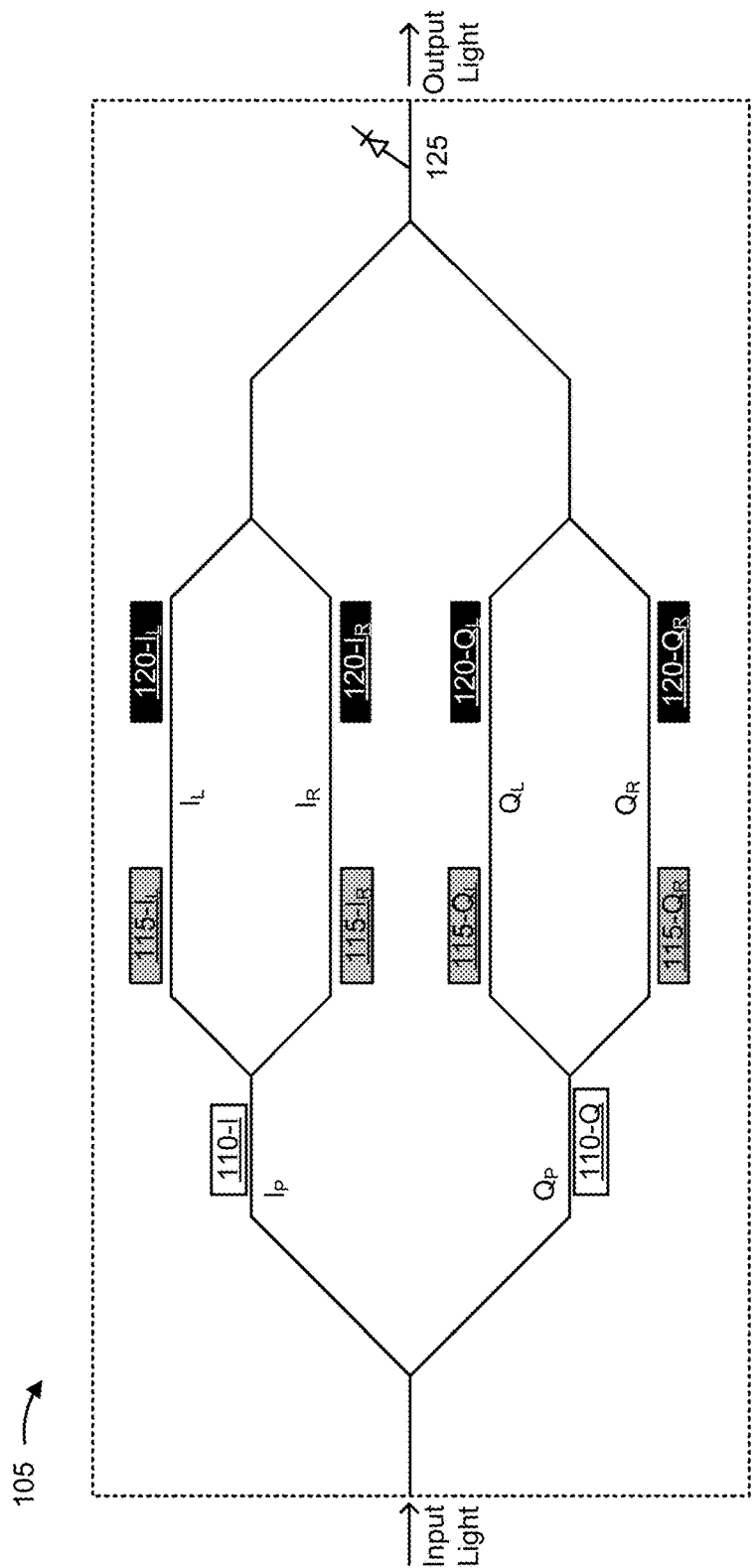

FIGS. 1A and 1B are diagrams of an example environment 100 in which the closed loop quadrature bias control technique, described herein, may be implemented. As shown in FIG. 1A, example environment 100 may include a Mach-Zehnder modulator 105 (herein referred to as MZM 105), a controller 150, and a light source 160.

MZM 105 includes an IQ phase modulator for modulating light based on electrical signals that represent data traffic (e.g., such that the data is encoded in the modulated light). In some implementations, MZM 105 includes a series of optical waveguides (e.g., formed in a semiconductor material) that form an I branch and a Q branch. Additional details regarding the arrangement of components (e.g., optical waveguides, electrodes, photodiodes, and/or the like) of MZM 105 are described below in connection with FIG. 1B.

In some implementations, MZM 105 may comprise a planar portion formed from a material that exhibits non-linear behavior and/or that experiences changes to an absorption characteristic due to a change in voltage (e.g., added absorption with increasing voltage) applied to MZM 105. For example, MZM 105 may comprise a planar portion formed from Indium Phosphide (InP). The closed loop quadrature bias control technique, described herein, may be implemented for such materials since non-linearities are shared equally between branches of MZM 105. Additionally, or alternatively, MZM 105 may be formed from Lithium Niobate (LiNBO$_3$), Silicon (Si), and/or another type of optical material. As shown in FIG. 1A, MZM 105 may be coupled to light source 160 (e.g., in order to receive light for modulation by MZM 105), and may be electrically connected to controller 150 (e.g., in order to transmit and receive electrical signals associated with encoding data, controlling and/or monitoring operation of MZM 105, and/or the like).

Notably, the closed loop quadrature bias control technique described herein may be implemented for a MZM 105 that comprises a material that exhibits non-linear behavior and/or absorption changes in response to changes in voltage (e.g., InP), whereas other techniques for ensuring operation of a MZM at the quad point could not be implemented for such materials (e.g., due to the non-linear and absorption characteristics of these materials). However, the closed loop quadrature bias control technique described herein can also be implemented for MZMs 105 comprising a material that exhibits substantially linear behavior and does not have the complication of added absorption with increasing voltage (e.g., LiNBO$_3$).

FIG. 1B is a diagram of example components of MZM 105. As shown in FIG. 1B, MZM 105 may include a series of optical waveguides (e.g., represented by solid lines within the dotted edges of MZM 105) that form an I branch and a Q branch in MZM 105, a set of parent DC electrodes 110 (e.g., electrodes 110-I and 110-Q), a set of child DC electrodes 115 (e.g., electrodes 115-I$_L$, 115-I$_R$, 115-Q$_L$, and 115-Q$_R$), a set of RF electrodes 120 (e.g., electrodes 120-I$_L$, 120-I$_R$, 120-Q$_L$, and 120-Q$_R$), and a photodiode 125.

As shown in FIG. 1B, and starting from an input side of MZM 105 (e.g., a left side in FIG. 1B), an input optical waveguide (e.g., via which input light is received from light source 160) splits to form an I parent (I$_P$) branch and a Q parent (Q$_P$) branch. As further shown, the I$_P$ branch splits to form a left I (I$_L$) arm and a right I (I$_R$) arm. Similarly, the Q$_P$ branch splits to form a left Q (Q$_L$) arm and a right Q (Q$_R$) arm. As shown, after RF electrodes 120, the arms of the I and Q branches are recombined such that output light is provided via an output optical waveguide (e.g., at the right side of MZM 105). As described herein, light passing through MZM 105 (e.g., from left to right in FIG. 1B) may be modulated to carry data represented by electrical signals provided by controller 150, while ensuring that MZM 105 operates at the quad point.

Parent DC electrode 110 includes an electrode arranged along (e.g., on, over, adjacent to, near, and/or the like) a parent branch of MZM 105. For example, as shown in FIG. 1B, electrode 110-I is arranged along the I$_P$ branch of MZM 105 and electrode 110-Q is arranged along the Q$_P$ branch of MZM 105. In some implementations, parent DC biases (e.g., a steady state electrical voltage or current) applied at electrodes 110-Q and/or 110-I (e.g., by controller 150 via respective independent electrical connections) may cause a portion of the input light passing through the Q branch of MZM 105 to be 90° phase-shifted with respect to a portion of the light passing through the I branch of MZM 105. In some implementations, the parent DC biases applied at electrodes 110-I and 110-Q may be applied, controlled, maintained, adjusted, and/or the like by controller 150 in order to ensure that the I branch and the Q branch operate at the quad point, as described in further detail below. In some implementations, electrodes 110-I and 110-Q are independently controllable by controller 150.

Child DC electrode 115 includes an electrode associated with applying a child DC bias with dither to a child branch of MZM 105. In some implementations, child DC electrode 115 is arranged along a child branch of MZM 105. For example, as shown in FIG. 1B, electrode 115-$I_L$ is arranged along the $I_L$ arm of MZM 105, electrode 115-$I_R$ is arranged along the $I_R$ arm of MZM 105, electrode 115-$Q_L$ is arranged along the $Q_L$ arm of MZM 105, and electrode 115-$Q_R$ is arranged along the $Q_R$ arm of MZM 105. In some implementations, child DC biases with dither applied at electrodes 115-$I_L$, 115-$I_R$, 115-$Q_L$, and/or 115-$Q_R$ (e.g., by controller 150 via respective independent electrical connections) introduce dither to light passing through the $I_L$ arm, the $I_R$ arm, the $Q_L$ arm, and/or the $Q_R$ arm, respectively. In some implementations, as described below, the application of different sets of child DC biases with dither may allow controller 150 to determine whether MZM 105 is operating at the quad point. In some implementations, electrodes 115-$I_L$, 115-$I_R$, 115-$Q_L$, and 115-$Q_R$ are independently controllable by controller 150.

RF electrode 120 includes an electrode associated with applying a RF signal (e.g., a voltage signal representing data) to a child branch of MZM 105. In some implementations, RF electrode 120 is arranged along the child branch of MZM 105. For example, as shown in FIG. 1B, electrode 120-$I_L$ is arranged on the $I_L$ arm of MZM 105, electrode 120-$I_R$ is arranged on the $I_R$ arm of MZM 105, electrode 120-$Q_L$ is arranged on the $Q_L$ arm of MZM 105, and electrode 120-$Q_R$ is arranged on the $Q_R$ arm of MZM 105. In some implementations, a first RF signal differentially applied to electrodes 120-$I_L$ and 120-$I_R$ (e.g., an I signal) by controller 150, and a second RF signal differentially applied to electrodes 120-$Q_L$ and 120-$Q_R$ (e.g., a Q signal) by controller 150, causes data, represented by the first and second RF signals, to be encoded in light passing through light provided by MZM 105.

Photodiode 125 includes a component that converts light, received at photodiode 125, into a return signal (e.g., an electrical signal corresponding to a characteristic of the light). As shown in FIG. 1B, photodiode 125 may be arranged on MZM 105 such that photodiode 125 receives a portion of output light to be output by MZM 105. In some implementations, photodiode 125 is configured to provide, to controller 150 (e.g., via an electrical connection), the return signal that corresponds to a characteristic (e.g., an intensity) of the output light received at photodiode 125. In some implementations, photodiode 125 is capable of differentiating a dither signal from an RF signal (e.g., by locking into the comparatively lower dither frequency, the RF signal may be averaged away). As described in further detail below, return signals provided by photodiode 125 may allow controller 150 to determine whether MZM 105 is operating at the quad point. In some implementations, photodiode 125 may be an AC coupled photodiode.

Returning to FIG. 1A, controller 150 includes a component associated with monitoring and/or controlling operation of MZM 105. For example, controller 150 may include a microcontroller, an integrated circuit, a processor, a system on a chip, and/or the like. In some implementations, controller 150 is capable of providing a set of electrical signals (e.g., voltage signals) to MZM 105 (e.g., via electrodes of MZM 105), where the set of electrical signals may include one or more electrical signals (e.g., parent DC biases, child DC biases, child DC biases with dither) associated with monitoring and/or controlling operation of MZM 105, one or more electrical signals (e.g., RF signals) representing data to be encoded in light passing through MZM 105, and/or the like. In some implementations, as described in further detail below, controller 150 may be capable of determining whether MZM 105 is operating at the quad point based on an electrical signal provided by MZM 105 and, based on the determination, adjusting a set of electrical signals applied to electrodes of MZM 105 in order to cause MZM 105 to operate at the quad point.

Light source 160 includes a component that provides light to be modulated by MZM 105 in order to carry data. For example, light source 160 may include a continuous wave laser source that provides a beam of light, where light source 160 is optically coupled to an input optical waveguide of MZM 105 such that the beam of light is received at an input optical waveguide of MZM 105.

The number and arrangement of components shown in FIGS. 1A and 1B are provided as an example. In practice, there may be additional components, fewer components, different components, differently arranged components, or differently connected components than those shown in FIGS. 1A and 1B. Furthermore, two or more components in FIGS. 1A and 1B may be implemented within a single component, or a single component shown in FIGS. 1A and 1B may be implemented as multiple, distributed components. Additionally, or alternatively, a set of components (e.g., one or more components) of FIGS. 1A and/or 1B may perform one or more functions described as being performed by another set of components of FIGS. 1A and/or 1B.

Figure 2:
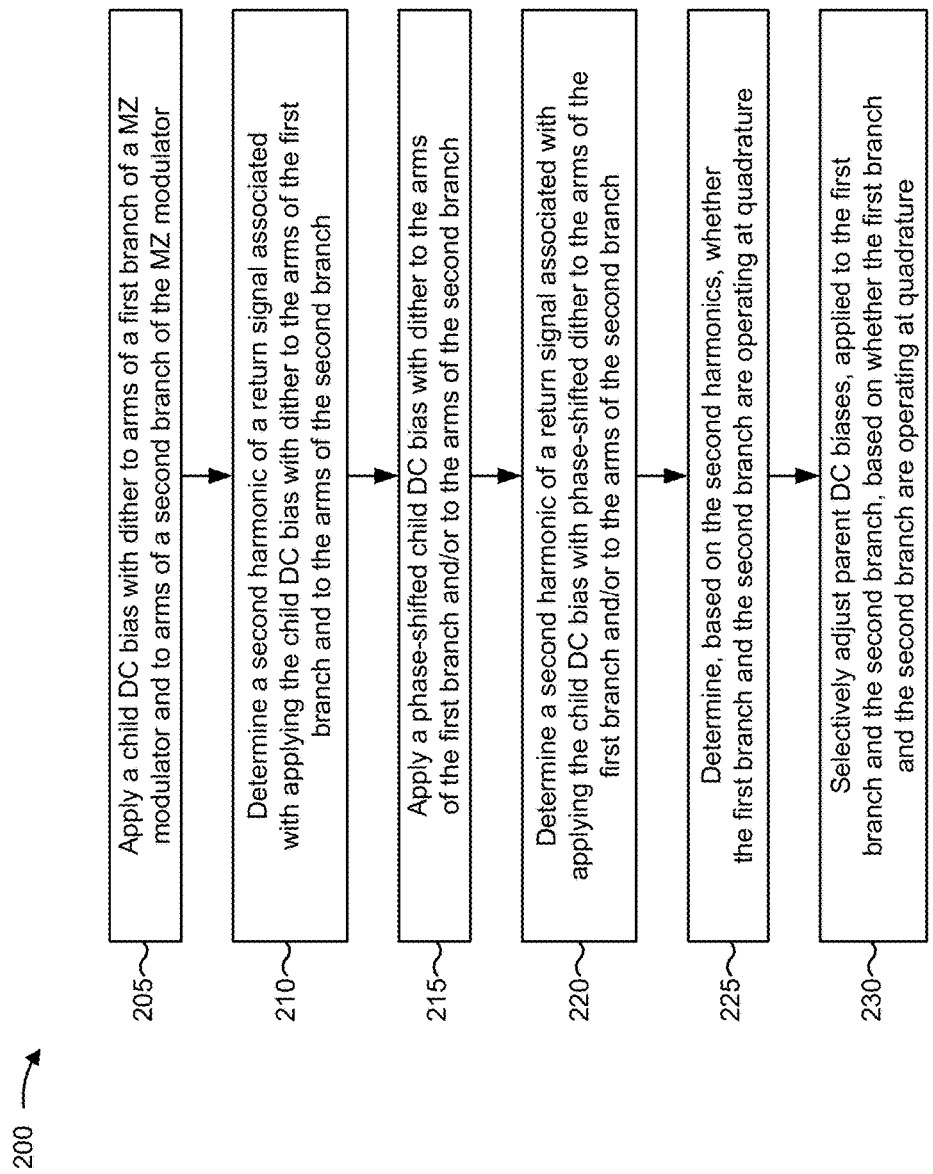
FIG. 2 is flow chart of an example process for using a closed loop bias quadrature control technique in order to ensure operation of an IQ phase modulator at quadrature.

FIG. 2 is a flow chart of an example process 200 for using a closed loop bias quadrature control technique in order to ensure operation of an IQ phase modulator at quadrature. In some implementations, one or more process blocks of FIG. 2 may be performed by controller 150. In some implementations, one or more process blocks of FIG. 2 may be performed by another component or a group of components separate from or including controller 150, such as by one or more components of MZM 105.

As shown in FIG. 2, process 200 may include applying a child DC bias with dither to arms of a first branch of a MZ modulator and to arms of a second branch of the MZ modulator (block 205). For example, controller 150 may apply a child DC bias with dither to arms of a first branch of MZM 105 and to arms of a second branch of MZM 105.

In some implementations, the child DC bias with dither includes a DC bias with a sinusoidal dither signal with a comparatively lower frequency and amplitude than that of an RF signal used to encode light passing through MZM 105. For example, the dither signal may have a frequency and/or an amplitude that is less than (e.g., one or more orders of magnitude less than) that of the RF signal. As a particular example, if RF signals (e.g., applied to RF electrodes 120 of MZM 105 by controller 150) have a frequency in the gigahertz (GHz) range (e.g., 32 GHz) and an amplitude of approximately 5.0 volt (V) or more, then the dither signal may have a frequency in the kilohertz (kHz) range (e.g., 8 kHz) or the megahertz (MHz) range, and may have an amplitude of approximately 0.1V. In some implementations, use of a dither signal with such a comparatively lower frequency and amplitude than the RF signals allows photodiode 125 to differentiate the dither signal from the RF signal (e.g., by locking into the comparatively lower dither frequency, the RF signal may be averaged away by photodiode 125). In some implementations, use of a dither signal with such a comparatively lower frequency and amplitude than the RF signals prevents the dither signal from introducing errors to output light of MZM 105. In other words, the frequency and amplitude of the dither signal may be selected such that operation of MZM 105 is not affected by the dither.

In some implementations, controller 150 may apply the child DC biases with dither to arms of a first branch of MZM 105 and to arms of a second branch of MZM 105. For example, controller 150 may separately apply matching pairs of differential child DC biases with dither to arms of the first branch and the second branch. As a particular example, controller 150 may apply a differential pair of sine wave signals to electrodes 115-I$_L$ and 115-I$_R$ of the I branch of MZM 105, and may (e.g., concurrently) apply a matching differential pair of sine wave signals to electrodes 115-Q$_L$ and 115-Q$_R$ of the Q branch of MZM 105.

In some implementations, controller 150 may apply the child DC bias with dither to the arms of the first and second branches concurrently with applying other electrical signals associated with operation of MZM 105. For example, controller 150 may apply the child DC bias with dither concurrently with applying parent DC biases, associated with causing the I branch and the Q branch to operate at quadrature, to electrodes 110-I and/or 110-Q. As another example, controller 150 may apply the child DC bias with dither concurrently with applying RF signals, associated with encoding data in light passing through MZM 105, to electrodes 120-I$_L$, 120-I$_R$, 120-Q$_L$, and/or 120-Q$_R$. In other words, controller 150 may apply the child DC bias with dither to electrodes 115-I$_L$, 115-I$_R$, 115-Q$_L$, and/or 115-Q$_R$ during operation of MZM 105, without a need to delay, stop, or otherwise impact encoding of data by MZM 105.

As further shown in FIG. 2, process 200 may include determining a second harmonic of a return signal associated with applying the child DC bias with dither to the arms of the first branch and to the arms of the second branch (block 210). For example, controller 150 may determine a second harmonic of a return signal associated with applying the child DC bias with dither to the arms of the first branch of MZM 105 and to the arms of the second branch of MZM 105.

In some implementations, controller 150 may determine the second harmonic of a return signal (e.g., an electrical signal corresponding to a characteristic of output light) provided by photodiode 125. For example, as described above, output light is formed by the recombination of light at an output waveguide of MZM 105 (e.g., a rightmost waveguide of MZM 105 in FIG. 1B). A portion of the output light may be received by photodiode 125, and photodiode 125 may provide, to controller 150 (e.g., via an electrical connection), a return signal that corresponds to an intensity of the output light received at photodiode 125. Here, controller 150 may determine the second harmonic of the return signal by, for example, pointwise multiplying the return signal by a cosine of twice the applied frequency, a result of which is the second harmonic of the return signal in arbitrary units.

In some implementations, controller 150 may store information associated with the second harmonic such that controller 150 may compare the second harmonic to another second harmonic in order to determine whether the I branch and the Q branch of MZM 105 are operating at quadrature, as described below.

As further shown in FIG. 2, process 200 may include applying a child DC bias with phase-shifted dither to the arms of the first branch and/or to the arms of second branch (block 215). For example, controller 150 may apply a child DC bias with phase-shifted dither to the arms of the first branch of MZM 105 and/or to the arms of the second branch of MZM 105.

In some implementations, controller 150 may apply the child DC bias with phase-shifted dither to the arms of the first branch and/or to the arms of the second branch based on (e.g., after) applying the child DC bias with dither to the arms of both the first branch and the second branch and/or after determining the second harmonic of the return signal in the manner described above. For example, controller 150 may determine the second harmonic of the return signal at a first time step, and may then apply the child DC bias with phase-shifted dither to the arms of the first branch and/or to the arms of the second branch (e.g., at a next time step).

In some implementations, the child DC bias with phase-shifted dither includes a dither signal that is out of phase with the dither signal, described above in connection with block 205, by a particular amount. For example, the phase-shifted dither signal may be out of phase with the dither signal, described above, by approximately 180° or by another angle between 0° and 360°. Other characteristics (e.g., a frequency, an amplitude, and/or the like) of the phase-shifted dither signal may match those of the dither signal described above.

In some implementations, controller 150 may apply the child DC bias with phase-shifted dither to the arms of one branch of MZM 105, and may apply the child DC bias with dither (without a phase shift) to the arms of the other branch of MZM 105. For example, controller 150 may apply a differential pair of sine wave signals to electrodes 115-I$_L$ and 115-I$_R$ of the I branch of MZM 105 (i.e., the child DC bias with dither described above in connection with block 205), and may (e.g., concurrently) apply a phase-shifted differential pair of sine wave signals (e.g., with a dither signal that is out of phase with from that applied to electrodes 115-I$_L$ and 115-I$_R$ by a particular amount, such as 180°) to electrodes 115-Q$_L$ and 115-Q$_R$ of the Q branch of MZM 105.

As another example, controller 150 may apply the differential pair of sine wave signals to electrodes 115-Q$_L$ and 115-Q$_R$ of the Q branch of MZM 105 (i.e., the child DC bias with dither described above in connection with block 205), and may (e.g., concurrently) apply a phase-shifted differential pair of sine wave signals (e.g., with a dither signal that is out of phase from that applied to electrodes 115-Q$_L$ and 115-Q$_R$ by a particular amount, such as 180°) to electrodes 115-I$_L$ and 115-I$_R$ of the I branch of MZM 105. In other words, in some implementations, controller 150 may apply the child DC bias with dither (e.g., with the same dither as previously described) to the arms of one branch of MZM 105, while applying the child DC bias with phase-shifted dither to the arms of the other branch of MZM 105.

Additionally, or alternatively, controller 150 may apply child DC biases with phase-shifted dithers to the arms of both branches of MZM 105. For example, controller 150 may apply a first phase-shifted differential pair of sine wave signals to electrodes 115-I$_L$ and 115-I$_R$ of the I branch of MZM 105 (e.g., including a dither signal with a first phase shift relative to the dither signal described above in connection with block 205), and may (e.g., concurrently) apply a second phase-shifted differential pair of sine wave signals to electrodes 115-Q$_L$ and 115-Q$_R$ of the Q branch of MZM 105 (e.g., including a dither signal with a second phase shift relative to the dither signal described above in connection with block 205). In other words, in some implementations, controller 150 may apply child DC biases with phase-shifted dithers to arms of both branches of MZM 105. In such a case, the relative phase difference between the first phase shift and the second phase shift should be approximately equal to a particular phase shift based on which controller 150 is configured to operate. For example, when the particular phase shift based on which controller 150 is to operate is 180°, as described above, the relative phase difference between the first phase shift and the second phase shift should be approximately equal to 180°.

In some implementations, controller 150 may apply the child DC bias with phase-shifted dither to the arms of the first branch and/or to the arms of the second branch concurrently with applying other electrical signals associated with operation of MZM 105. For example, controller 150 may apply the child DC bias with phase-shifted dither concurrently with applying parent DC biases, associated with causing the I branch and the Q branch to operate at quadrature, to electrodes 110-I and/or 110-Q. As another example, controller 150 may apply the child DC bias with phase-shifted dither concurrently with applying RF signals, associated with encoding data in light passing through MZM 105, to electrodes 120-$I_L$, 120-$I_R$, 120-$Q_L$, and/or 120-$Q_R$. In other words, controller 150 may apply the child DC bias with phase-shifted dither to electrodes 115-$I_L$, 115-$I_R$, 115-$Q_L$, and/or 115-$Q_R$ during operation of MZM 105, without a need to delay, stop, or otherwise impact encoding of data by MZM 105.

As further shown in FIG. 2, process 200 may include determining a second harmonic of a return signal associated with applying the child DC bias with phase-shifted dither to the arms of the first branch and/or to the arms of the second branch (block 220). For example, controller 150 may determine a second harmonic of a return signal associated with applying the child DC bias with phase-shifted dither to the arms of the first branch of MZM 105 and/or to the arms of the second branch of MZM 105.

In some implementations, controller 150 may determine the second harmonic of a return signal provided by photodiode 125 in a manner similar to that described above in connection with block 210. For example, controller 150 may determine the second harmonic of the return signal, associated with applying the child DC bias with phase-shifted dither, by pointwise multiplying the return signal by a cosine of twice the applied frequency, which provides the second harmonic of the return signal in arbitrary units.

In some implementations, controller 150 may store information associated with the second harmonic such that controller 150 may compare the second harmonic to the previously determined second harmonic in order to determine whether the I branch and the Q branch of MZM 105 are operating at quadrature, as described below.

As further shown in FIG. 2, process 200 may include determining, based on the second harmonics, whether the first branch and the second branch are operating at quadrature (block 225). For example, controller 150 may determine, based on the second harmonics, whether the first branch of MZM 105 and the second branch of MZM 105 are operating at quadrature. In some implementations, controller 150 may determine whether the first branch and the second branch are operating at quadrature based on the second harmonics determined in the manner described above. For purposes of clarity, the second harmonic determined based on the return signal associated with applying the child DC bias with dither to the arms of the first branch and to the arms of the second branch is herein referred to as "second harmonic 1," while the second harmonic determined based on the return signal associated with applying the child DC bias with phase-shifted dither to the arms of the first branch and/or to the arms of the second branch is herein referred to as "second harmonic 2."

In some implementations, controller 150 may determine whether the first branch and the second branch of MZM 105 are operating at quadrature based on second harmonic 1 and second harmonic 2. For example, controller 150 may determine the difference between second harmonic 1 and second harmonic 2 (e.g., by subtracting second harmonic 2 from second harmonic 1). Here, if the difference between second harmonic 1 and second harmonic 2 is equal to zero, then controller 150 may determine that the first branch and the second branch are operating at quadrature. Conversely, if the difference between second harmonic 1 and second harmonic 2 is not equal to zero (i.e., differs from zero, is greater than or equal to zero), then controller 150 may determine that the first branch and the second branch are not operating at quadrature.

As further shown in FIG. 2, process 200 may include selectively adjusting parent DC biases, applied to the first branch and the second branch, based on whether the first branch and the second branch are operating at quadrature (block 230). For example, controller 150 may selectively adjust parent DC biases, applied to the first branch of MZM 105 and the second branch of MZM 105, based on whether the first branch of MZM 105 and the second branch of MZM 105 are operating at quadrature.

In some implementations, if controller 150 determines that the first branch and the second branch of MZM 105 are operating at quadrature, then selectively adjusting the parent DC biases (e.g., DC biases applied to electrodes 110-I and/or 110-Q) may include maintaining (i.e., not adjusting) parent DC biases already being applied to electrodes 110-I and/or 110-Q. In such a case, controller 150 may maintain the applied parent DC biases since the first branch and the second branch are operating at quadrature (i.e., since no phase correction adjustment is needed).

In some implementations, if controller 150 determines that the first branch and the second branch of MZM 105 are not operating at quadrature, then selectively adjusting the parent DC biases may include adjusting the parent DC biases applied to electrodes 110-I and 110-Q. For example, if controller 150 determines that the first branch and the second branch are not operating at quadrature, then controller 150 may increase a DC bias applied to one branch by a particular amount, and may decrease the DC bias applied to the other branch by the particular amount (i.e., the same amount). An effect of increasing a parent DC bias is to lengthen an optical path length (i.e., increase delay) introduced in the associated branch, while an effect of decreasing a parent DC bias is to shorten an optical path length (i.e., decrease delay) in the associated branch. In this way, the phase delay between the first and second branches may be adjusted in order to cause the first branch and the second branch to operate at quadrature.

In some implementations, controller 150 may adjust the parent DC biases based on a difference between second harmonic 1 and second harmonic 2. For example, controller 150 may adjust the parent DC biases based on whether the difference between second harmonic 1 and second harmonic 2 is a positive value or a negative value and based on whether a slope, corresponding to a quadrature point based on which MZM 105 is configured to operate (herein referred to as a selected quad point), is positive or negative.

In some implementations, controller 150 may store or have access to information that identifies whether the slope, corresponding to the selected quad point, is positive or negative as a result of a calibration process associated with MZM 105. Such a calibration process may include, for example, ramping through a set of possible values of the parent DC biases, and plotting a difference of resulting second harmonics, which produces a sine wave. An example of such a plot is shown in FIG. 3. With reference to FIG. 3 as an example, each zero (e.g., point 305, point 310, and others not shown) corresponds to a quadrature point, any of which may be chosen as the selected quad point. Here, based on the sine wave, the slope corresponding to the selected quad point may be readily identified as positive or negative. For example, in FIG. 3, the slope at point 305 is negative and the slope at point 310 is positive. Here, controller 150 may store information that identifies the slope, corresponding to the selected quad point, as being positive or negative (e.g., controller 150 may store a value of −1 if point 305 is selected, or may store a value of 1 if point 310 is selected).

In some implementations, controller 150 may adjust the parent DC biases based on a difference between second harmonic 1 and second harmonic 2 relative to the selected quad point. For example, with reference to FIG. 3, if a point corresponding to the difference between second harmonic 1 and second harmonic 2 is a positive value (e.g., point 315 in FIG. 3) and point 305 is the selected quad point (e.g., a quad point with a negative slope), then controller 150 may adjust the parent DC biases by increasing a difference between the parent DC biases (e.g., moving to the right on the horizontal axis of FIG. 3) in order to bring MZM 105 closer to operation at the selected quad point. However, if the point corresponding to the difference between second harmonic 1 and second harmonic 2 is a negative value (e.g., point 320 in FIG. 3) and point 305 is the selected quad point, then controller 150 may adjust the parent DC biases by decreasing a difference between the parent DC biases (e.g., moving to the left on the horizontal axis of FIG. 3) in order to bring MZM 105 closer to operation at the selected quad point.

As another example, again with reference to FIG. 3, if a point corresponding to the difference between second harmonic 1 and second harmonic 2 is a positive value (e.g., point 325 in FIG. 3) and point 310 is the selected quad point (e.g., a quad point with a positive slope), then controller 150 may adjust the parent DC biases by decreasing a difference between the parent DC biases in order to bring MZM 105 closer to operation at the selected quad point. However, if the point corresponding to the difference between second harmonic 1 and second harmonic 2 is a negative value (e.g., point 330 in FIG. 3) and point 310 is the selected quad point, then controller 150 may adjust the parent DC biases by increasing a difference between the parent DC biases in order to bring MZM 105 closer to operation at the selected quad point. As indication above, FIG. 3 is provided merely as an example for illustrative purposes, and other examples are possible.

In some implementations, controller 150 may incrementally adjust the parent DC biases. For example, controller 150 may increase the parent DC bias applied to one branch by a default amount, and may decrease the parent DC bias applied to the other branch by the default amount. An effect of these adjustments may be to bring the branches closer to operation at the quad point, and additional incremental adjustments may be made in subsequent iterations of process 200. In some implementations, controller 150 may adjust the parent DC biases using pre-defined step sizes, step sizes that are proportional to the difference between second harmonic 1 and second harmonic 2, and/or the like. In some implementations, controller 150 may implement a proportional, integral, differential (PID) loop in order to adjust the parent DC biases.

Additionally, or alternatively, controller 150 may adjust the parent DC biases by an amount selected to cause the first branch and the second branch to operate at quadrature. For example, controller 150 may determine, based on the difference between second harmonic 1 and second harmonic 2, an amount by which to adjust the parent DC biases that should cause the first branch and the second branch to operate at the quad point, and may adjust the parent DC biases accordingly. Additional adjustments may be made in subsequent iterations of process 200.

In some implementations, controller 150 may repeat process 200 (e.g., multiple times per second, multiple times per minute, multiple times within a time period, etc.) in order to monitor and/or control MZM 105 such that the first branch and the second branch of MZM 105 operate at quadrature.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

Figure 4A:
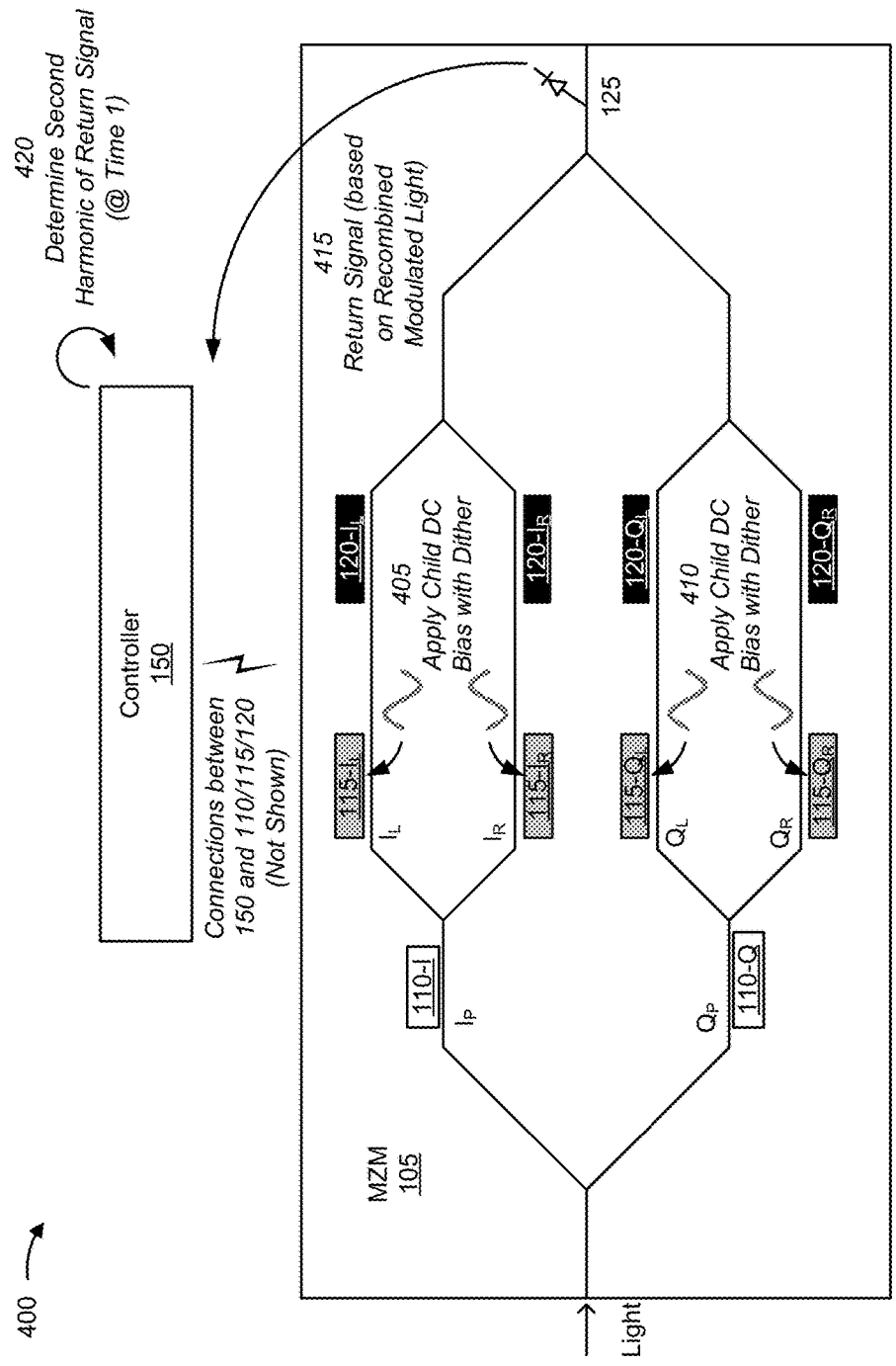
FIGS. 4A-4C are diagrams of an example implementation associated with the example process described in connection with FIG. 2.
Figure 4B:
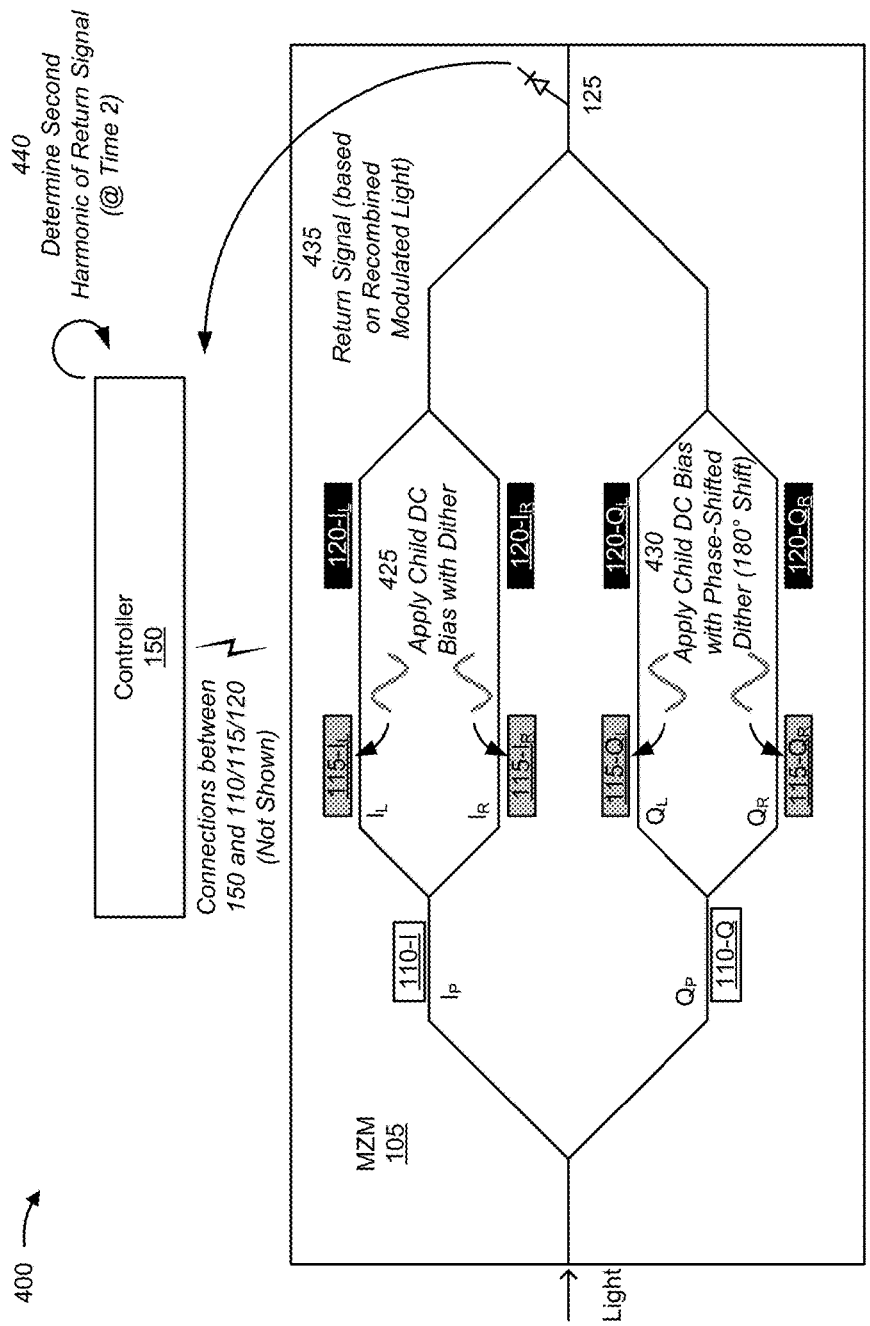
Figure 4C:
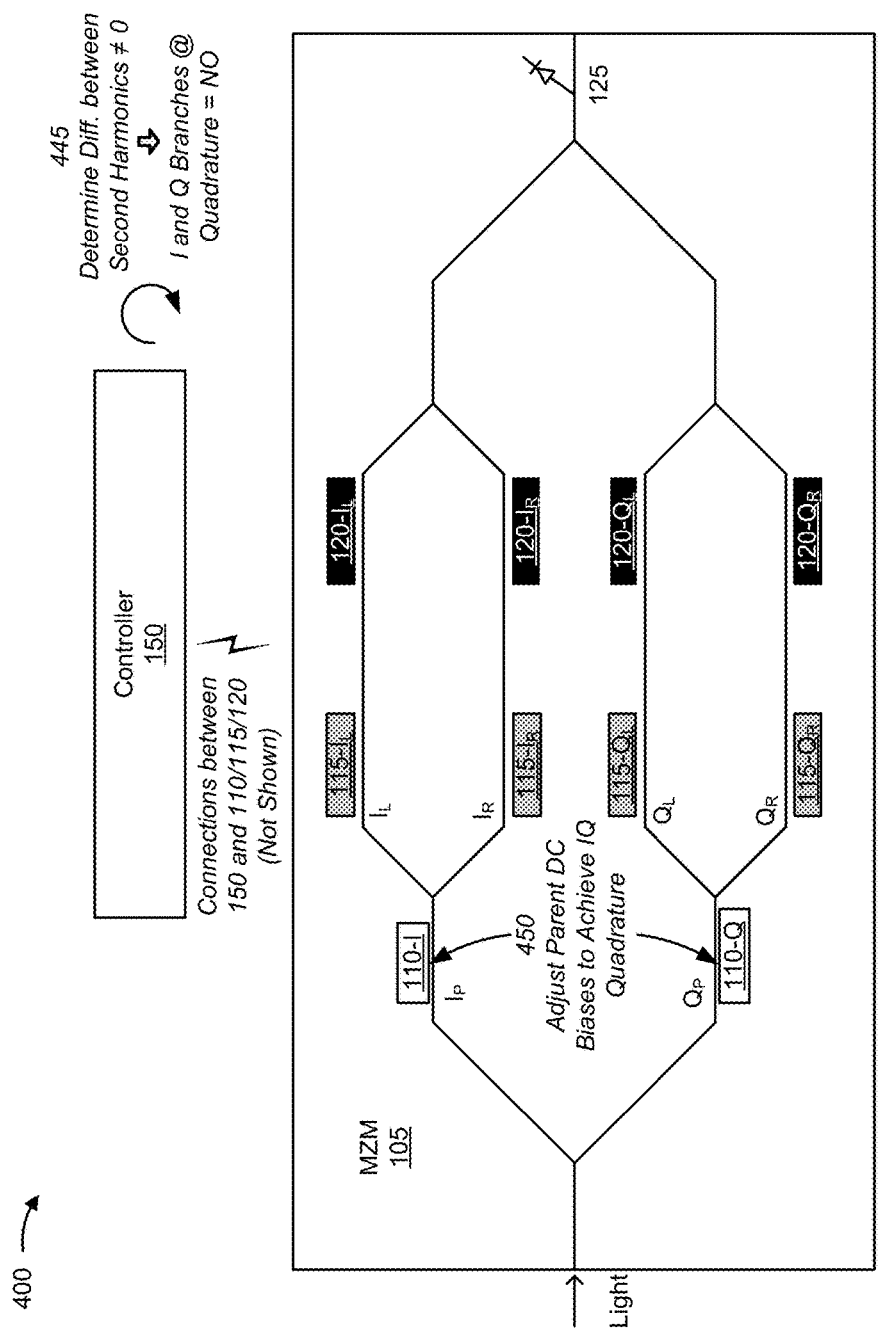

FIGS. 4A-4C are diagrams of an example implementation 400 associated with example process 200. For the purposes of example implementation 400, MZM 105 receives input light from light source 160 (not shown), and controller 150 is configured to apply (e.g., via respective electrical connections, not shown in example implementation 400) parent DC biases to electrodes 110-I and 110-Q in order to cause MZM 105 to operate at quadrature and to apply RF signals (e.g., with a frequency of 32 GHz and an amplitude of 1.0V) to electrodes 120-$I_L$, 120-$I_R$, 120-$Q_L$, and 120-$Q_R$ in order to encode data in light passing through MZM 105.

As shown in FIG. 4A, and by reference numbers 405 and 410, controller 150 may apply a child DC bias with dither to the arms of the I branch and to the arms of the Q branch. In one example, the child DC bias may be similar in frequency and/or amplitude to the parent DC biases described above, while the dither may have a frequency of 8 kHz and an amplitude of 0.1V. For example, controller 150 may apply a differential pair of sine wave signals to electrodes 115-$I_L$ and 115-$I_R$ of the I branch of MZM 105, and may (e.g., concurrently) apply a matching differential pair of sine wave signals to electrodes 115-$Q_L$ and 115-$Q_R$ of the Q branch of MZM 105.

As shown by reference number 415, after the light in each branch is modulated (e.g., based on the RF signals applied to electrodes 120-$I_L$, 120-$I_R$, 120-$Q_L$, and 120-$Q_R$) and recombined in order to form modulated output light, photodiode 125 may receive a portion of the output light and provide a return signal, corresponding to the intensity of the output light, to controller 150 (e.g., via an electrical connection not shown in FIG. 4A).

As shown by reference number 420, upon receiving the return signal, controller 150 may determine the second harmonic of the return signal. The second harmonic associated with applying the child DC bias with dither to the arms of the I branch and to the arms of the Q branch is referred to as second harmonic A in example implementation 400.

As shown in FIG. 4B by reference number 425, after applying the child DC bias with dither to the arms of the I branch and to the arms of the Q branch, controller 150 may apply the same child DC bias with dither (i.e., the same dither as previously applied) to the arms of the I branch (e.g., in the manner described above).

However, as shown by reference number 430, controller 150 may apply a child DC bias with phase-shifted dither to the arms of the Q branch. For example, controller 150 may apply a differential pair of sine wave signals to electrodes 115-$Q_L$ and 115-$Q_R$ of the Q branch of MZM 105. Here, the phase-shifted dither signal may be out of phase with the dither signal by a particular amount, such as by approximately 180°, but otherwise be identical to the dither signal.

As shown by reference number 435, after the light in each branch is modulated (e.g., based on the RF signals applied to electrodes 120-I$_L$, 120-I$_R$, 120-Q$_L$, and 120-Q$_R$) and recombined in order to form modulated output light, photodiode 125 may receive a portion of the output light and provide a return signal, corresponding to the intensity of the output light, to controller 150 (e.g., via an electrical connection not shown in FIG. 4B).

As shown by reference number 440, upon receiving the return signal, controller 150 may determine the second harmonic of the return signal. The second harmonic associated with applying the child DC bias with dither to the arms of the I branch and applying the child DC bias with phase-shifted dither to the arms of the Q branch is herein referred to as second harmonic B in example implementation 400.

As shown in FIG. 4C, and by reference number 445, controller 150 may determine that a difference between second harmonic A and second harmonic B is not equal to zero and, based on the determination, may determine that the I branch and the Q branch of MZM 105 are not operating at the quad point.

As shown by reference number 450, based on determining that the I branch and the Q branch are not operating at the quad point, controller 150 may adjust the parent DC biases (e.g., applied to electrodes 115-I$_L$ and 115-I$_R$) in order to cause the I branch and the Q branch to operate at the quad point.

As indicated above, FIGS. 4A-4C are provided merely as an example. Other examples are possible and may differ from what was described with regard to FIGS. 4A-4C.

Some implementations described herein provide a closed loop quadrature bias control technique for monitoring and/or controlling operation of an IQ phase modulator in order to cause the IQ phase modulator to operate at the quad point, despite behavioral changes and/or fabrication tolerances associated with the IQ phase modulator. The closed loop quadrature bias control technique monitors and/or controls the operation of the IQ phase modulator based on applying child DC biases with dither to arms of I and Q branches of the IQ phase modulator, and does not affect or delay data encoded by the IQ phase modulator.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An electro-optic device, comprising:
   a Mach-Zehnder modulator (MZM); and
   one or more components to:
   apply a child DC bias with dither to arms of a first branch of the MZM and to arms of a second branch of the MZM;
   determine a second harmonic of a first return signal associated with applying the child DC bias with dither to the arms of the first branch and to the arms of the second branch;
   apply a child DC bias with phase-shifted dither to the arms of the first branch or to the arms of the second branch,
   the phase-shifted dither being out of phase from the dither, and
   the phase-shifted dither having a frequency that matches a frequency of the dither;
   determine a second harmonic of a second return signal associated with applying the child DC bias with phase-shifted dither to the arms of the first branch or to the arms of the second branch;
   determine, based on the second harmonic of the first return signal and the second harmonic of the second return signal, whether the first branch and the second branch are operating at quadrature; and
   selectively adjust parent DC biases, applied to the first branch and the second branch, based on whether the first branch and the second branch are operating at quadrature.

2. The electro-optic device of claim 1, where the one or more components, when determining whether the first branch and the second branch are operating at quadrature, are to:
   determine that the first branch and the second branch are operating at quadrature when a difference between the second harmonic of the first return signal and the second harmonic of the second return signal is equal to zero.

3. The electro-optic device of claim 2, where the one or more components, when selectively adjusting the parent DC biases, are to:
   maintain application of the parent DC biases already being applied to the first branch and the second branch.

4. The electro-optic device of claim 1, where the one or more components, when determining whether the first branch and the second branch are operating at quadrature, are to:
   determine that the first branch and the second branch are not operating at quadrature when a difference between the second harmonic of the first return signal and the second harmonic of the second return signal is greater than or less than zero.

5. The electro-optic device of claim 4, where the one or more components, when selectively adjusting the parent DC biases, are to:
   increase a parent DC bias being applied to the first branch by a particular amount; and
   decrease a parent DC bias being applied to the second branch by the particular amount.

6. The electro-optic device of claim 1, where the one or more components, when applying the child DC bias with phase-shifted dither to the arms of the first branch or to the arms of the second branch, are to:
apply the child DC bias with phase-shifted dither to the arms of the first branch while continuing to apply the child DC bias with dither to the arms of the second branch.

7. The electro-optic device of claim 1, where the one or more components, when applying the child DC bias with phase-shifted dither to the arms of the first branch or to the arms of the second branch, are to:
apply the child DC bias with phase-shifted dither to the arms of the first branch and to the arms of the second branch.

8. The electro-optic device of claim 1, where the MZM comprises a planar portion formed from Indium Phosphide.

9. An electro-optic IQ phase modulator, comprising:
a Mach-Zehnder modulator (MZM); and
a controller to:
determine a second harmonic of a first return signal resulting from application of a child DC bias with dither to arms of a first branch of the MZM and to arms of a second branch of the MZM;
determine a second harmonic of a second return signal resulting from application of a child DC bias with phase-shifted dither to the arms of the first branch or to the arms of the second branch,
the phase-shifted dither being out of phase from the dither, and
the phase-shifted dither having a frequency that matches a frequency of the dither;
determine, based on the second harmonic of the first return signal and the second harmonic of the second return signal, whether the first branch and the second branch are operating at quadrature; and
selectively adjust parent DC biases, applied to the first branch and the second branch, based on whether the first branch and the second branch are operating at quadrature.

10. The electro-optic IQ phase modulator of claim 9, where the controller, when determining whether the first branch and the second branch are operating at quadrature, is to:
determine whether the first branch and the second branch are operating at quadrature based on whether a difference between the second harmonic of the first return signal and the second harmonic of the second return signal differs from zero.

11. The electro-optic IQ phase modulator of claim 9, where the controller, when selectively adjusting the parent DC biases, is to:
maintain application of the parent DC biases already being applied to the first branch and the second branch when the controller determines that the first branch and the second branch are operating at quadrature.

12. The electro-optic IQ phase modulator of claim 9, where the controller, when selectively adjusting the parent DC biases, is to:
increase a parent DC bias being applied to the first branch by a particular amount and decrease a parent DC bias being applied to the second branch by the particular amount when the controller determines that the first branch and the second branch are not operating at quadrature.

13. The electro-optic IQ phase modulator of claim 9, the phase-shifted dither is out of phase from the dither by approximately 180 degrees.

14. The electro-optic IQ phase modulator of claim 9, where the controller is further to:
apply the child DC bias with dither to the arms of the first branch and to the arms of the second branch.

15. The electro-optic IQ phase modulator of claim 9, where the controller is further to:
apply the child DC bias with phase-shifted dither to the arms of the second branch while continuing to apply the child DC bias with dither to the arms of the first branch.

16. The electro-optic IQ phase modulator of claim 9, where the controller is further to:
apply the child DC bias with phase-shifted dither to the arms of the first branch and to the arms of the second branch.

17. The electro-optic IQ phase modulator of claim 9, where the MZM comprises a planar portion formed from a material that exhibits non-linear behavior or changes to an absorption characteristic with a change in voltage applied to the MZM.

18. A method comprising:
applying, by a controller, a child DC bias with dither to arms of a first branch of a Mach-Zehnder modulator (MZM) and to arms of a second branch of the MZM;
determining, by the controller, a second harmonic of a first return signal associated with applying the child DC bias with dither to the arms of the first branch and to the arms of the second branch;
applying, by the controller, a child DC bias with phase-shifted dither to the arms of the first branch or to the arms of the second branch,
the phase-shifted dither being out of phase from the dither, and
the phase-shifted dither having a frequency that matches a frequency of the dither;
determining, by the controller, a second harmonic of a second return signal associated with applying the child DC bias with phase-shifted dither to the arms of the first branch or to the arms of the second branch;
determining, by the controller, whether the first branch and the second branch are operating at quadrature based on the second harmonic of the first return signal and the second harmonic of the second return signal; and
selectively adjusting, by the controller, parent DC biases, applied to the first branch and the second branch, based on whether the first branch and the second branch are operating at quadrature.

19. The method of claim 18, where determining whether the first branch and the second branch are operating at quadrature comprises:
determining that the first branch and the second branch are operating at quadrature based on a difference between the second harmonic of the first return signal and the second harmonic of the second return signal.

20. The method of claim 18, where selectively adjusting the parent DC biases comprises:
maintaining application of the parent DC biases already being applied to the first branch and the second branch when the first branch and the second branch are operating at quadrature; or
changing the parent DC biases being applied to the first branch or the second branch by a particular amount when the first branch and the second branch are not operating at quadrature.

* * * * *